United States Patent
Bhogi et al.

(10) Patent No.: US 7,082,432 B2
(45) Date of Patent: Jul. 25, 2006

(54) SPECIFYING TRANSACTION MANAGER TYPE AT VARIOUS APPLICATION LEVELS

(75) Inventors: Sankara R. Bhogi, Bangalore (IN); Ajay Kumar, Bangalore (IN); Bala Dutt, Bangalore (IN); Venugopal Rao K, Bangalore (IN); Srinivasan Kannan, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 454 days.

(21) Appl. No.: 10/422,307

(22) Filed: Apr. 24, 2003

(65) Prior Publication Data

US 2004/0215894 A1  Oct. 28, 2004

(51) Int. Cl.
*G06F 17/30* (2006.01)

(52) U.S. Cl. .................. 707/10; 707/103 R; 707/104.1

(58) Field of Classification Search ................ 709/201, 709/202; 715/839; 707/10, 103 R, 104.1, 707/3, 4
See application file for complete search history.

(56) References Cited

U.S. PATENT DOCUMENTS

| | | | |
|---|---|---|---|
| 5,504,899 A | | 4/1996 | Raz |
| 5,504,900 A | | 4/1996 | Raz |
| 5,630,081 A | * | 5/1997 | Rybicki et al. ............. 715/839 |
| 5,701,480 A | | 12/1997 | Raz |
| 6,038,587 A | | 3/2000 | Phillips et al. |
| 6,243,737 B1 | * | 6/2001 | Flanagan et al. ........... 709/202 |
| 6,421,688 B1 | | 7/2002 | Song |
| 6,442,618 B1 | | 8/2002 | Phillips et al. |
| 6,832,238 B1 | * | 12/2004 | Sharma et al. .............. 709/201 |
| 6,854,646 B1 | | 2/2005 | Ieshima et al. |
| 6,862,573 B1 | | 3/2005 | Kendall et al. |
| 6,873,995 B1 | | 3/2005 | Benson |
| 2002/0124083 A1 | | 9/2002 | Jeyaraman et al. |
| 2004/0088413 A1 | | 5/2004 | Bhogi et al. |
| 2004/0153349 A1 | | 8/2004 | K et al. |
| 2004/0153383 A1 | | 8/2004 | K et al. |
| 2004/0153450 A1 | | 8/2004 | K et al. |
| 2004/0215473 A1 | | 10/2004 | Bhogi et al. |
| 2004/0216109 A1 | | 10/2004 | Bhogi et al. |
| 2005/0015353 A1 | | 1/2005 | Kumar et al. |
| 2005/0015425 A1 | | 1/2005 | Kumar et al. |
| 2005/0055325 A1 | | 3/2005 | Dutt et al. |
| 2005/0066155 A1 | | 3/2005 | Dutt et al. |

OTHER PUBLICATIONS

Liu et al., "Designing a Test Suite for Empirically-based Middleware Performance Prediction," Australian Computer Society, Inc., (2002), (8 Pages).
"Java™ 2SDK, Enterprise Edition 1.3.1 Configuration Guide," java.sun.some/j2ee/sdk_1.3/techdocs/release/ConfigGuide.html, Jan. 3, 2002, (16 Pages).

(Continued)

Primary Examiner—Frantz Coby
(74) Attorney, Agent, or Firm—Robert C. Kowert; Meyertons, Hood, Kivlin, Kowert & Goetzel, P.C.

(57) ABSTRACT

A system and method for specifying a transaction manager type at various levels in an application. A system may implement several application components in which each application component may use a different transaction manager type. A transaction manager type may be specified at a module or component level for each of the application components. The transaction manager type may also be specified at an instance wide level.

31 Claims, 9 Drawing Sheets

OTHER PUBLICATIONS

Ellis et al., :JDBC™ 3.0 Specification—Final Release, Sun Microsystems, Inc., Oct. 2001, (190 pages).

"iPlanet Application Server 6.0 Administration Guide: Chapter 4 Logging Server Messages,", docs.sun.com/source/816-5720-10/adlog.htm, Sep. 5, 2000, (21 Pages).

"JDBC™ Data Access API—The JDBC API Universal Data Acess for the Enterprise," java.sun.com, Aug. 10, 2003, (5 Pages).

"Connection Pooling," Advanced Programming for the Java 2 Platform, Aug. 16, 2002, (4 Pages).

Siva Visveswaram, "Manage Acess to Shared, Server-Side Resources for High Performance—Dive Into Connection Pooling with j2EE," JavaWorld, Oct. 2000, (8 Pages).

"Interface DataSource," DataSource (Java 2 Platform, SE v1.4.1), 2002, (1 Page).

"Initial Context," JNDI 1.2.1 Specification: Class Initial Context, //java.sun.com/products/jndi/1.2/javadox/javax/naming/InitialContext.html, Jul. 14, 1999, (1 Page).

JNDI—JAVA™ Naming & Directory Interface™, sun Microsystems, Inc., http://java.sun.com/jndi, May 15, 2003 (2 Pages).

"iPlanet Application Server 6.0 Administration Guide: Chapter 9 Administering Transactions," //docs.sun.com/source/816-5784-10/adtrans.htm, Sep. 5, 2000, (11 Pages).

Breitbart et al., "Replication and Consistency Being Lazy helps Sometimes," PODS '97, Jun. 1997, (pp. 173-184).

Patricia Serrano-Alvarado et al. "Mobile Transaction Supports for DBMS". In 17ièmes Journées Bases de Données Avancées, Agadir, Maroc, Oct. 2001, (19 Pages).

Efficient and Flexible Methods for Transient Versioning of Records to Avoid Locking by Read-Only Transactions, 1992 ACM SIGMOD, Jun. 1992, (pp. 124-133).

Dogac et al., "METU Interoperable Database System," Demo Description, In Proc. Of ACM Sigmod Intl. Conf. On Management of Data, Jun. 1996, (6 Pages).

Oracle9i JDBC Developer's Guide and Reference (Mar. 2002, retrieved from stanford.edu/dept/itss/docs/oracle/9i/java.920/a96654/toc.htm on Sep. 6, 2005.

Kannegaard (J2EE BluePrints, Mar. 20, 2000 retrieved from java.sun.com/blueprints/guidelines/designing_enterprise_applications/apmTOC.html on Sep. 6, 2005).

"Simplified Guide to the Java™ 2 Platform Enterprise Edition," Sun Microsystems, Inc., 1999, (13 Pages).

* cited by examiner

SPECIFYING TRANSACTION MANAGER TYPE AT VARIOUS APPLICATION LEVELS

BACKGROUND OF THE INVENTION

1. Field of the Invention

This invention relates to computer systems and computer software, and more particularly to transaction management in computer-systems.

2. Description of the Related Art

Each application that runs on an application server may have an application state that includes data the application may use and/or change. The data defining the application state may be stored on data sources such as, but not limited to, databases. Operations used to modify data stored in the data sources may be grouped together in transactions. Transactions may have characteristics including, but not limited to, atomicity (either all of the operations in the group are applied to the data in the database, or none of the operations in the group are applied), consistency (the transaction is a correct transformation of the data in the database according to instructions executed by an application component), isolation (each transaction does not affect other simultaneously occurring transactions), and durability (if a transaction completes successfully, failures in an application component or database will not corrupt the transformation of the data in the database). After a transaction completes, the data in the data sources may be modified. If a transaction fails (e.g., is not completed), the data used in the data sources involved in the transaction may be rolled back to its pre-transaction state.

As an application starts, an application server may start a new transaction and open connections to data sources the application needs. When the application server opens a connection to a data source, the connection may be managed as a local transaction connection or a global transaction connection. A local transaction may involve a one-phase commit and may be used when an application needs one data source. A global transaction may involve a two-phase commit and may be used when an application needs two or more data sources. In conventional application servers, all transactions must be managed the same for any given instance of the application server, i.e., all local transactions or all global transactions.

Global transactions may be managed by a separate transaction manager in an application server such as a Java Transaction Services (JTS) manager. The global transaction may use a two-phase commit protocol. A global transaction may involve a transaction protocol such as the X/Open Distributed Transaction Processing XA standard from The Open Group vendor consortium. Before a global transaction is committed to its respective data sources (i.e., to modify respective data in the data sources), each data source involved in the global transaction may be asked to prepare to commit the transaction. If each data source is able to commit the transaction, each data source may send a signal to the transaction manager indicating so. After all of the data sources have indicated that they are prepared to commit the transaction, the transaction manager may send a signal to commit the global transaction.

Local transactions may be managed by a resource manager. Typically, a local transaction is performed in a manner specific to the data source. Local transactions (typically involving one data source) do not need to use the first phase of the global transaction two-phase protocol (i.e., asking if the data sources are prepared to commit the transaction). In a local transaction, if the data source is prepared to commit the transaction, the data source commits the transaction when the resource manager is instructed to by the application server. In general, a local transaction may be performed faster than a global transaction. Also, different data sources may have different capabilities. For example, if a data source does not support a global transaction protocol, then it may not be able to participate in global transactions.

After a transaction is committed, the transaction may be recorded in a transaction log to keep track of the transaction in case a data source fails during the commit phase. If a data source fails during the commit phase, the data source may be updated using the information in the transaction log. If a data source fails during the commit phase, the data source may request transaction information from the transaction log. The transaction log may send information for a committed transaction to the data source that failed during the commit to allow the data source to update itself.

SUMMARY OF THE INVENTION

In one embodiment, a system may have a memory coupled to one or more processors and configured to store program instructions executable to implement several application components. Each application component implemented may be configured to start a transaction involving access to one or more data sources. A transaction manager type may be specified at a module or component level for each of the application components. In one embodiment, the transaction type may be specified as either global or local. The program instructions may be further executable to implement an application server configured to determine the transaction manager type specified for each component and then manage each transaction using the specified type of transaction manager.

In one embodiment, a method may include determining a transaction manager type to use for a transaction initiated by an application component. In one embodiment, determining the transaction manager type may include returning the transaction manager type as specified at a module or component level for the application component. If the transaction manager type is determined to be global, the transaction may be managed using a global transaction manager. If transaction manager type is determined to be local, the transaction may be managed using a local transaction manager.

BRIEF DESCRIPTION OF THE DRAWINGS

A better understanding of the present invention may be obtained when the following detailed description is considered in conjunction with the following drawings.

Figure 1:
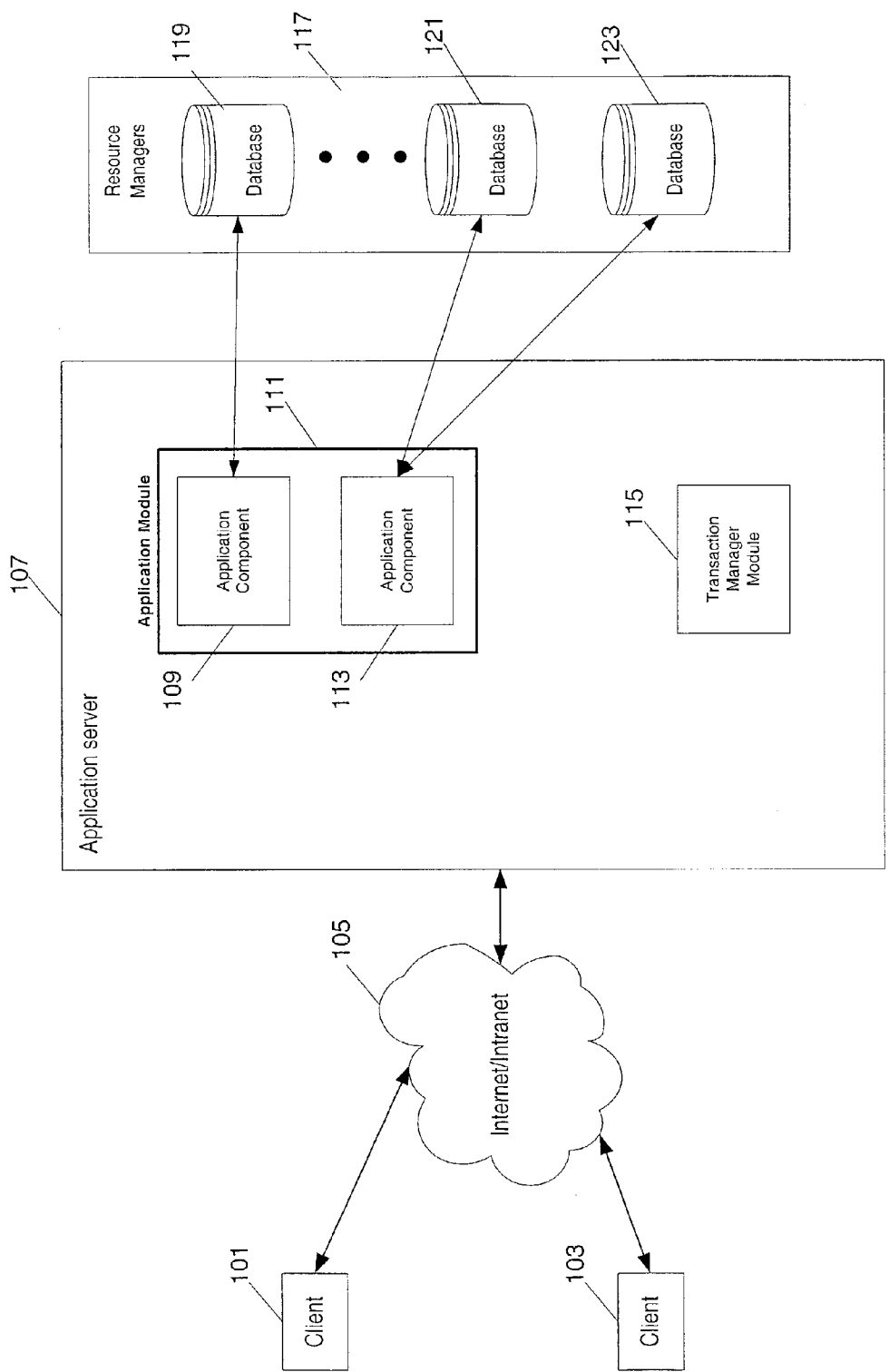
FIG. 1 illustrates an embodiment of an application server with an application module and a transaction manager application module accessing a database connected to the application server.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 illustrates an embodiment of an application server 107 with an application module 111 and a transaction manager module 115. In one embodiment, an application running on the application server 107 may include application module 111. The application module 111 may include application components 109 and 113 that may modify data in one or more data sources, such as databases 119, 121, and 123, using a transaction. In one embodiment, the application server 107 may simultaneously manage multiple types of transactions with the databases 119, 121, and 123, including, but not limited to, local transactions and global transactions. In one embodiment, the application server 107 may use a common interface for the multiple types of transactions. The transaction manager type for each transaction may be set at an application component level, an application module level, and/or an instance-wide level. In one embodiment, the application server 107 may look to the different levels in a predetermined order to determine a transaction manager type to use for each transaction.

In one embodiment, an application server 107 may run a plurality of application components (e.g., application components 109 and 113). In one embodiment, application components 109 and 113 may be collections of data and methods to operate on the collections of data. For example, the application components 109 and 113 may be web applications, enterprise beans, message-driven beans, application clients, or connectors. In one embodiment, an application module 111 may be a package of application components, such as, but not limited to application components 109 and 113. One or more application modules 111 may be included in an application on the application server 107.

In one embodiment, an application server 107 may run several applications simultaneously. An instance-wide attribute may apply to the applications running on the application server 107. For example, an instance-wide attribute may be set to define a type of transaction manager to use for all transactions running on the application server 107. In one embodiment, the application components 109 and 113 may be configured to start transactions involving access to one or more data sources 119, 121, and 123 such as, but not limited to, databases, managed by resource mangers 117. Other data sources may also be within the scope of the invention.

In one embodiment, a transaction may be a group of operations on data stored in a data source. The transactions may have characteristics including, but not limited to, atomicity (either all of the operations in the group are applied to the data stored in the data source, or none of the operations in the group are applied), consistency (the transaction is a correct transformation of the data stored in the data source according to instructions executed by an application component), isolation (each transaction does not affect other simultaneously occurring transactions), and durability (if a transaction completes successfully, failures in an application component or data source will not corrupt the transformation of the data stored in the data source). For example, if the transaction includes a group of operations to transfer a sum of money from one bank account to another bank account (where the account balances are saved in a database), the transaction may not be committed to the database with the account balances until both the operation of debiting the amount from the first bank account and the operation of adding the amount to the second bank account have been performed. After the transaction is committed (i.e., the bank account balances updated to reflect the transfer), a transaction log may keep track of the transaction in case the database with the bank account balances fails during the commit phase of the transaction. If the database fails during the commit phase, the database may then be updated using the information in the transaction log.

In one embodiment, a transaction manager type for the transaction may be specified as global or local at an application module level 111 or application component level for each of the application components 109 and 113. In one embodiment, the application server 107 may be configured to determine the transaction manager type specified for each application component 109 and 113 and manage each transaction using the specified type of transaction manager 115. In one embodiment, the application server 107 may be coupled to clients 101 and 103 through a network 105 such as, but not limited to the Internet and/or one or more local networks.

In one embodiment, the application components 109 and 113 executing on the application server 107 may need to access and modify data sources 119, 121, and 123, such as, but not limited to, databases, coupled to the application server 107. Before executing the application components 109 and 113, the application server 107 may initiate a transaction and open connections to needed data sources 119, 121, and 123. When the application server 107 establishes a connection to a data source 119, 121, and 123, the connection may be opened as a local transaction connection or a global transaction connection. A local transaction involving a one-phase commit may be used when accessing only one data source 119, 121, and 123. Local transactions involving one data source 119, 121, or 123 may not need to use the first phase of a two-phase commit (i.e., asking if the data source is prepared to commit). If the data source 119, 121, or 123 is prepared to commit, the data source commits the transaction when instructed to by the application server 107. A global transaction involving a two-phase commit may be used when accessing two or more different data sources 119, 121, and 123. Before a transaction is committed to the connected data sources 119, 121, and 123, each data source 119, 121, and 123 may be asked to prepare to commit. If each data source 119, 121, and 123 is able to commit, it may send a signal to the transaction manager application module 115 indicating so. After all of the data sources 119, 121, and 123 have indicated that they are prepared to commit, the transaction manager application module 115 may send a signal to commit the transaction and record the transaction in a transaction log. If the local transaction or global transaction is not completed successfully, the transaction manager application module may instruct the involved data sources 119, 121, and 123 to rollback any changes made during the transaction.

In one embodiment, one or more of the data sources 119, 121 or 123 may be a logical data source that can associate with a local transaction capable version of the resource and a global transaction capable (e.g. XA) version of the resource. Based on what transaction type is started, the appropriate resource will be selected.

Figure 2:
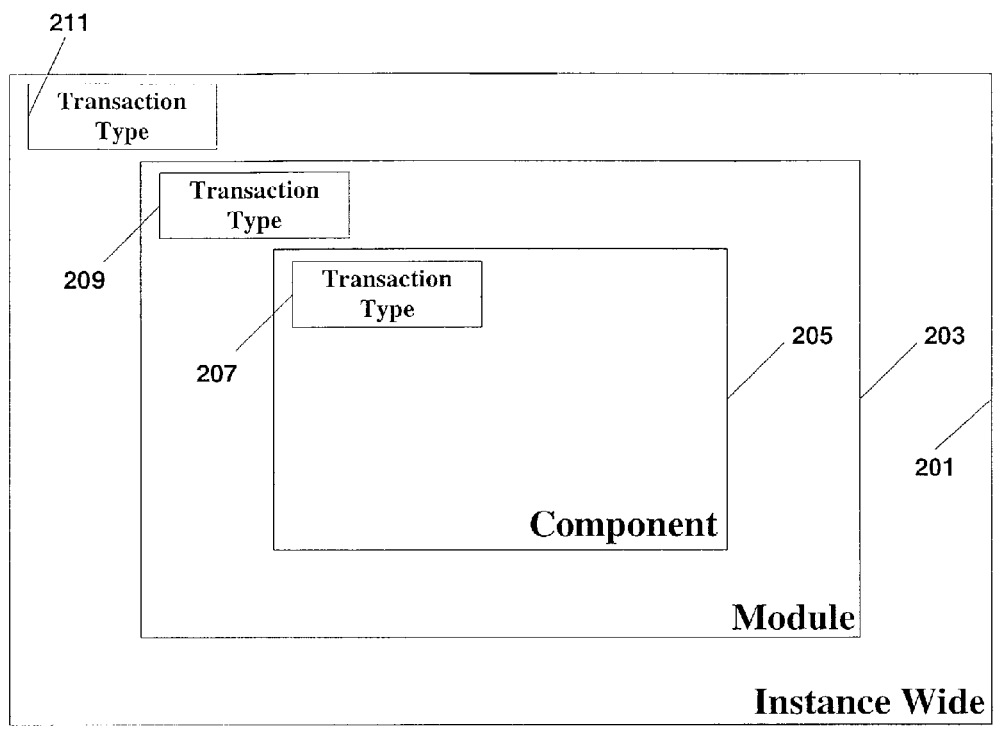
FIG. 2 illustrates an embodiment of specifying a transaction manager type at an application component level, an application module level, and an instance-wide level.

FIG. 2 illustrates an embodiment of a transaction manager type specification at an application component level, an application module level, and an instance-wide level. In one embodiment, the transaction manager type 207, 209, and 211 may be specified at the instance-wide level 201, the application module level 203, and/or the application component level 205. For example, the transaction manager type for the application module 111 may be specified at the application module level 203. The application components 109 and 113 may use the transaction manager type specified application module level 203. In one embodiment, the application module may include a Web Archive (WAR), an Enterprise Java Bean (EJB), or a Java Archive (JAR) file. Other application modules are also within the scope of the invention. In one embodiment, if the transaction manager type is not specified at the application module level 203, a transaction manager type may be specified at the application component level 205. For example, each application component 109 and 113 may have a transaction manager type specified. In one embodiment, the application component 109 and 113 may include a servlet or an Enterprise Java Bean (EJB) application components. Other application components are also within the scope of the invention. In one embodiment, if the transaction manager type is not specified at the application component level 205, a transaction manager type may be specified at the instance-wide level 201. If the transaction manager type is not specified at the instance-wide level 201, an error may be returned to the application component attempting to initiate the transaction.

In one embodiment, the application server 107 may have runtime logic configured to determine the transaction manager type for each transaction according to the transaction manager type 207 specified for the application component 109 or 113 that initiates the transaction. For example, if the transaction manager type 209 is specified at the application module level 203, the runtime logic may return the transaction manager type 209 specified at the application module level 203. In another example, if the transaction manager type 207 is specified at the application component level 205, and not specified at the application module level 203, the runtime logic may return the transaction manager type specified at each application component level 205. In one embodiment, the transaction manager type may be statically specified for one or more application components in a deployment descriptor for each application component. In another example, if a default transaction manager type 211 is specified at the instance-wide level 201, and the transaction manager type is not specified at the application module level 203 or the application component level 205, the runtime logic may return the default transaction manager type 211. The default, or instance-wide, transaction manager type may be specified in a configuration file for the application server.

Figure 3:
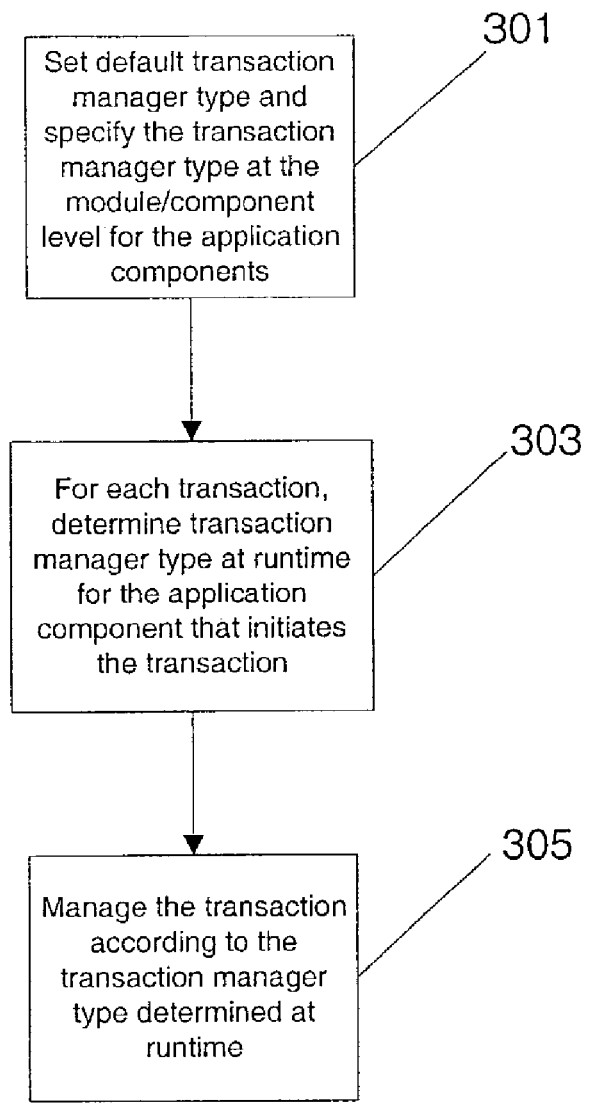
FIG. 3 illustrates an embodiment of a flowchart for specifying a transaction manager type and managing transactions according to the transaction manager type specified for the transaction.

FIG. 3 illustrates an embodiment of a flowchart for specifying a transaction manager type and managing transactions according to the transaction manager type specified for the transaction. It should be noted that in various embodiments of the methods described below, one or more of the steps described may be performed concurrently, in a different order than shown, or may be omitted entirely. Other additional steps may also be performed as desired.

At 301, a transaction manager type may be specified at an application module/application component level for application components. In one embodiment, the transaction manager type may be specified for each application component in an application module at the application module level. In addition or alternatively, an application component in the application module may have a transaction manager type specified at the application component level. A default transaction manager type may be specified at the instance-wide level.

At 303, a transaction manager type may be determined at runtime for each transaction for the application component that initiates the transaction. For example, the specified transaction manager type may be searched for first at the application module level, second at the application component level, and third at the instance-wide level. Other search orders and levels may also be within the scope of the invention. In one embodiment, runtime logic on the application server may be used to determine the specified transaction manager type.

At 305, the transaction may be managed according to the transaction manager type determined at runtime. In one embodiment, the transaction manager application module may manage the transaction with the application component according to the type of transaction manager specified at the application module level, application component level, and/ or instance-wide level.

Figure 4:
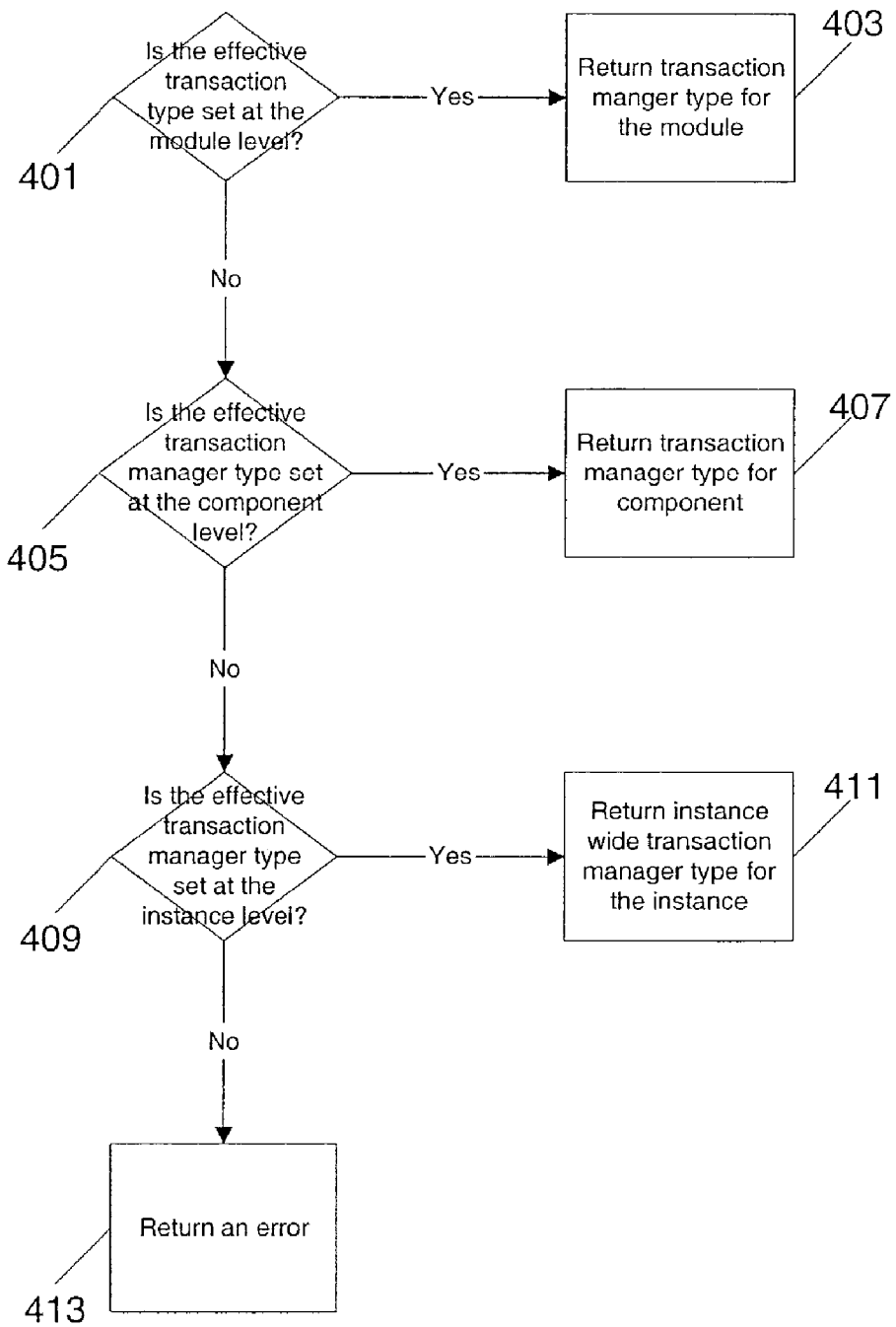
FIG. 4 illustrates an embodiment of a flowchart to determine a transaction manager type for use with an application component, application module, or instance.

FIG. 4 illustrates an embodiment of a flowchart to determine a transaction manager type for use with an application component, application module, or instance. It should be noted that in various embodiments of the methods described below, one or more of the steps described may be performed concurrently, in a different order than shown, or may be omitted entirely. Other additional steps may also be performed as desired.

At 401, whether the transaction manager type has been specified at the application module level may be determined. A runtime logic may be used by the application server to determine if the transaction manager type has been specified.

At 403, if the transaction manager type has been specified at the application module level, the transaction manager type for the application module may be returned. For example, a transaction manager type of "global" may have been specified at the application module level. The runtime logic may return "global" as the transaction manager type to use for each application component in the application module.

At 405, if the transaction manager type has not been specified at the application module level, whether the transaction manager type has been specified at the application component level may be determined. In one embodiment, the runtime logic may search each application component to determine if the transaction manager type has been specified at the application component level.

At 407, if the transaction manager type has been specified at the application component level, the transaction manager type for the application component may be returned. For example, a transaction type of "local" may have been specified at the application component level. In one embodiment, if an effective transaction type is specified at both the application module level and the application component level, the runtime logic may return the transaction manager type specified at the application module level and ignore the transaction manager type specified at the application component level.

At 409, if the transaction manager type has not been specified at the application component level, whether the transaction manager type has been specified at the instance-wide level may be determined. A transaction manager type may be specified at the instance-wide level as a default.

At 411, if the transaction manager type has been specified at the instance-wide level, the instance-wide transaction manager type may be returned for the instance. For example, a transaction type of "global" may have been specified at the instance-wide level. In one embodiment, if an effective transaction type is specified at the instance-wide level as well as at the application module level and/or the application component level, the runtime logic may return the transaction manager type specified at the application module level or application component level and ignore the transaction manager type specified at the instance-wide level.

At 413, if the transaction manager type has not been specified at the instance-wide level, an error may be returned. In one embodiment of the invention, another location for a default transaction manager type may be specified.

Specifying the transaction type at an application component level may provide a fine granularity for specifying transaction type to optimize performance. Specifying the transaction type at an application module level allows module-level granularity without the need to specify transaction type for each component. Specifying an instance-wide transaction type provides a default type when neither a component nor module level transaction type is specified.

Figure 5:
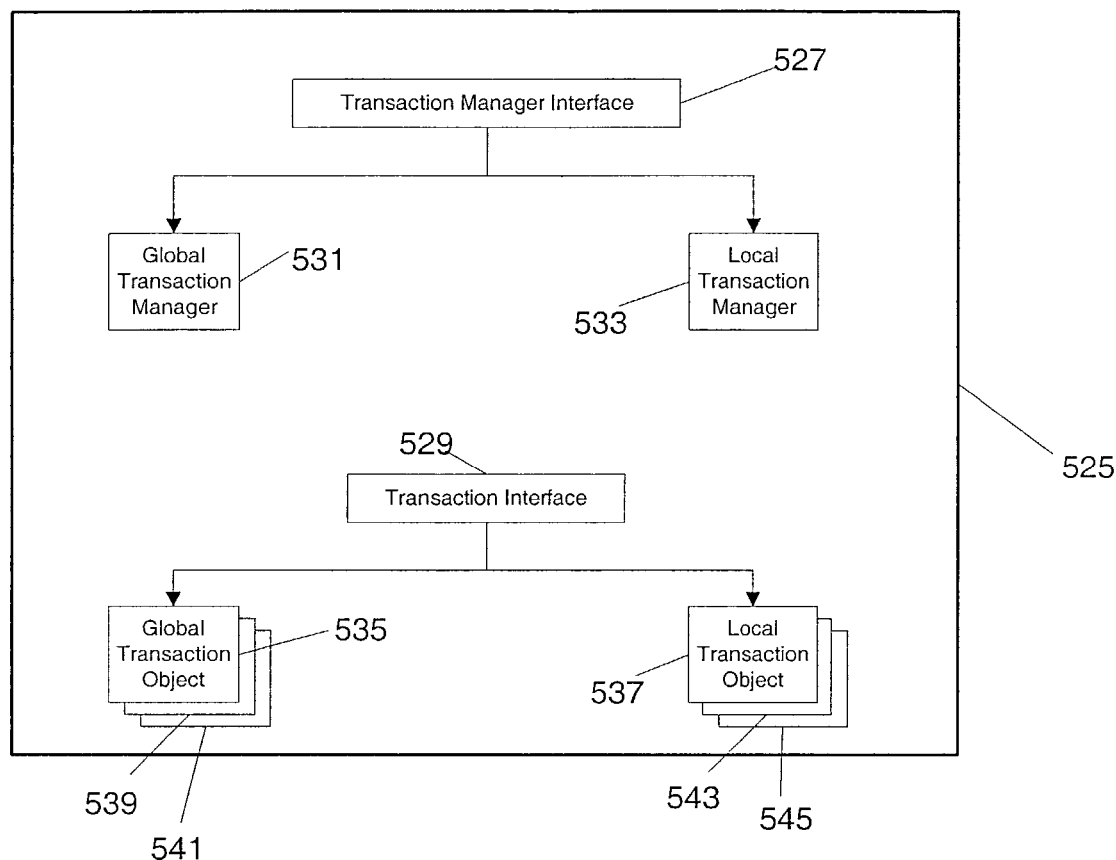
FIG. 5 illustrates an embodiment of a transaction manager application module with a common interface for global transactions and local transactions.

FIG. 5 illustrates an embodiment of a transaction manager module 525 with a common interface for global transactions and local transactions. In one embodiment, a transaction manager 525 may have a common transaction manager interface 527 and a common transaction interface 529. For example, the transaction manager interface 527 may be a common interface for both global transaction manager 531 and local transaction manager 533. In one embodiment, the global transaction manager 531 may create a global transaction object (e.g., in an object oriented programming language), such as, but not limited to global transaction objects 535, 539, and 541, for each transaction managed by the global transaction manager. In one embodiment, the local transaction manager 533 may create a local transaction object, such as, but not limited to local transaction objects 537, 543, and 545, for each transaction managed by the local transaction manager.

Thus, the transaction manager module 525 may provide a common interface for interacting with both local and global transactions. This common interface may provide a common interface to return a type of transaction manager to use at runtime. For example, the common interface may include a getTxnMgr( ) method to determine the transaction manager using the following logic:

```
ETT_determined = false
if ( Application module level transaction manager type is specified )
{
    ETT = Application module level transaction manager type
    ETT_determined = true
}
if ((ETT_determined = = false) and (Application component level
    transaction manager type is specified))
{
    ETT = Application component level transaction manager type
    ETT_determined = true
}
if ( ETT_determined = = false )
{
    ETT = Instance-wide transaction manager type
    ETT_determined = true
}
```

In the logic above, "ETT" may represent "effective transaction type" and "ETT_determined" may represent a state of whether the transaction manager type has been found (i.e., "false" for not found, "true" for found). Other program instructions may also be within the scope of the invention. In one embodiment, the transaction manager type may be specified at several levels including, but not limited to, the application component level, the application module level, and the instance-wide level. The appropriate "effective transaction type" may be selected by the runtime logic.

The global transaction objects 535, 541, and 539 may be created by the global transaction manager 531 and may each implement the common transaction interface 529. Similarly, local transaction objects 537, 543, and 545 may be created by the local transaction manager 533 and may each implement the common transaction interface 529. The global transaction objects 535, 541, and 539 and local transaction objects 537, 543, and 545 may be created as global transaction manager singletons and local transaction manager singletons respectively when the application server starts up.

A common interface may be used for both local transactions and global transactions. This common interface may include an common interface for thread association and disassociation for global and local transactions. Each transaction may be specific to a single thread of execution. When a transaction (global or local) is started, the transaction manager module's common interface may be used to associate the transaction with a particular thread. When the transaction is completed, the transaction manager module's common interface may be used to disassociate the transaction from the thread. The common interface for thread association/disassociation may also be used when suspending and resuming a transaction.

The common interface provided by the transaction manager module 525 for local and global transactions may include a common interface for object association and disassociation. For example, different objects in an application server container may be part of a transaction and may need to know different events like "transaction has started", "transaction is about to commit" and "transaction is completed", etc. The common object association/disassociation interface may provide a common interface for objects involved in global or local transactions to receive (or no longer receive) such events or other transaction information.

The common interface provided by the transaction manager module 525 for local and global transactions may include a common query interface for object and thread association. This interface may be used to determine which transaction a particular object is associated with or which transaction a particular thread is associated with.

A distributed transaction may span multiple processes. The common interface provided by the transaction manager module 525 for local and global transactions may include a common interface to send transactional context from one process to another and create the transaction from the context.

In one embodiment, the common interface provided by the transaction manager module 525 for local and global transactions may include a common interface for all the standard interfaces required by the Java Transaction API (JTA) developed by Sun Microsystems, Inc. JTA specifies standard Java™ interfaces between a transaction manager and the parties involved in a distributed transaction system: the resource manager, the application server, and the transactional applications.

Figure 6:
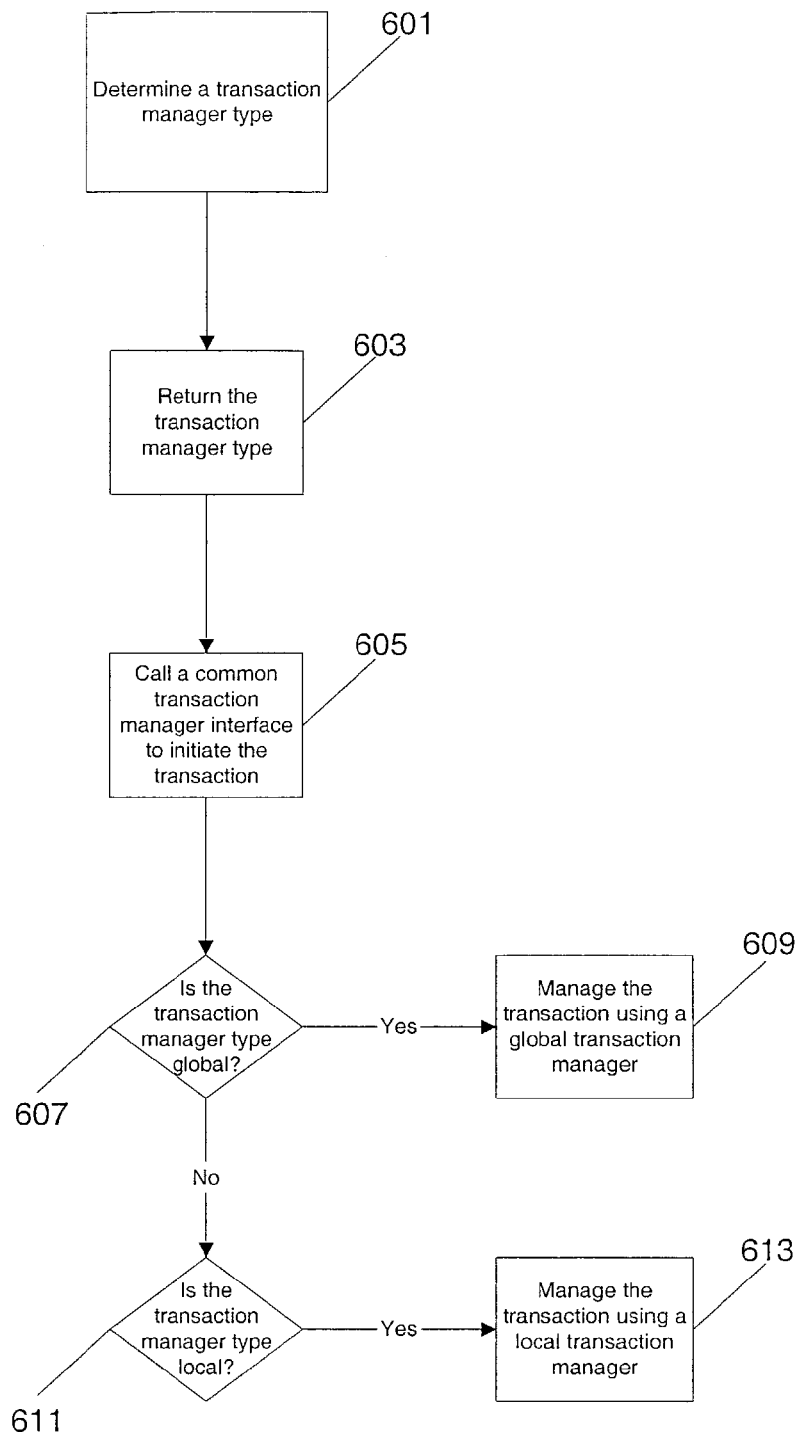
FIG. 6 illustrates an embodiment of a flowchart for using a common transaction manager interface to initiate a transaction.

FIG. 6 illustrates an embodiment of a flowchart for using a common transaction manager interface to initiate a transaction. It should be noted that in various embodiments of the methods described below, one or more of the steps described may be performed concurrently, in a different order than shown, or may be omitted entirely. Other additional steps may also be performed as desired.

At 601, a transaction manager type may be determined for a transaction to be initiated by the application component. At 603, the transaction manager type may be returned for the application component. At 605, a common transaction manager interface may be called to initiate a transaction of the type returned. At 607, whether the runtime logic returned the transaction manager type as global may be determined. At 609, if the runtime logic did return the transaction manager type as global, the transaction may be managed using a global transaction manager. At 611, whether the runtime logic returned the transaction manager type as local may be determined. At 613, if the runtime logic returned the transaction manager type as local, the transaction may be managed using a local transaction manager.

Figure 7:
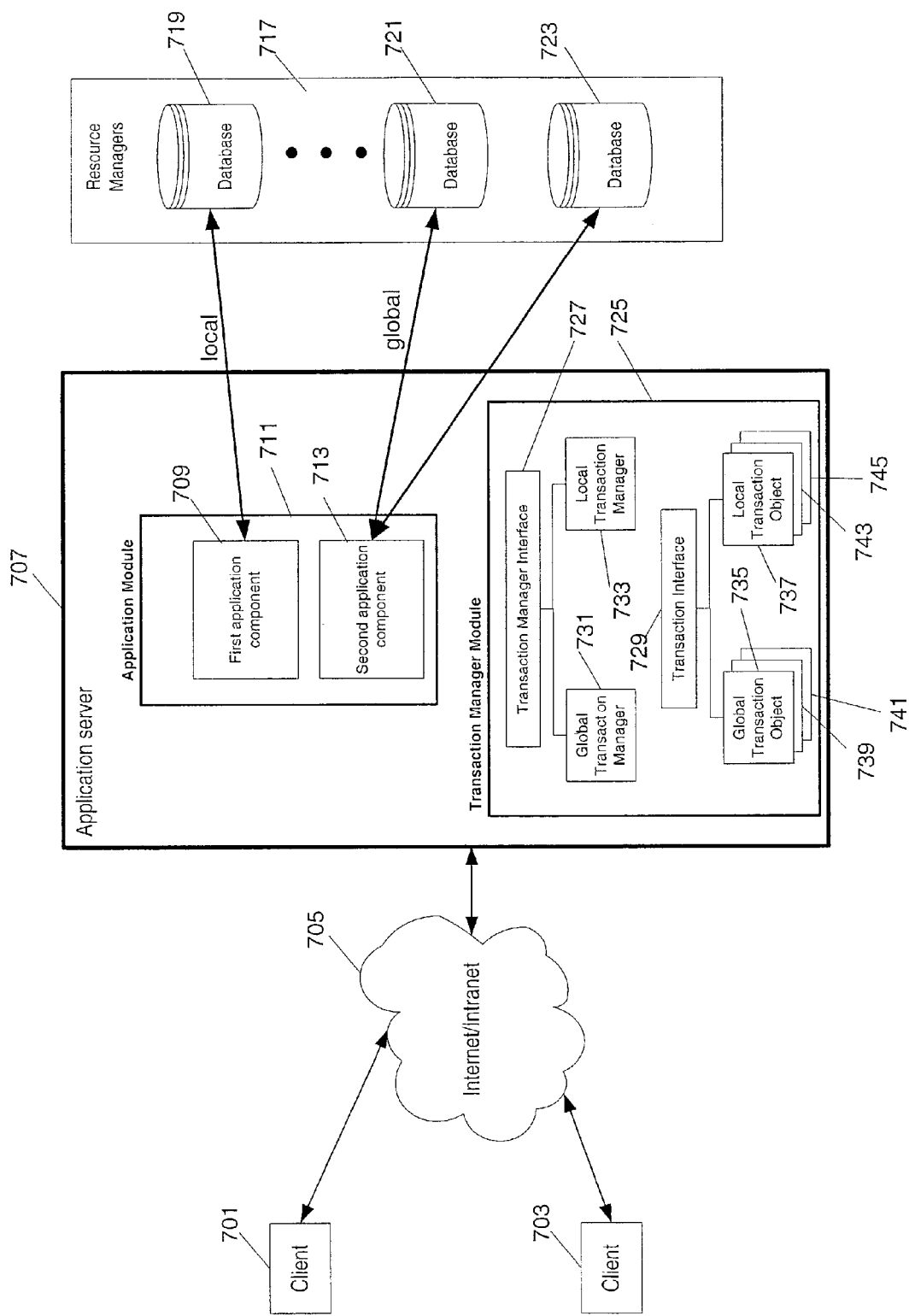
FIG. 7 illustrates an embodiment of an application server initiating transactions for a first application component and a second application component using a common transaction manager interface.

FIG. 7 illustrates an embodiment of an application server initiating transactions for a first and second application component using a common interface. In one embodiment, clients 701 and 703 may access an application server 707 over a network 705. The application server 707 may run an application module 711 including application components 709 and 713. In one embodiment, the first application component 709 may have a "local" transaction type specified at the application component level while there might not be a transaction type specified at the application module level. Runtime logic may determine that the effective transaction type for the first application component is therefore "local". A transaction may be started by the transaction manager application module 725 with a common transaction manager interface 727 for local transaction manager 733 and global transaction manager 731. The local transaction manager 733 may create a local transaction object 737 for a local transaction initiated by the first application component 709 with database 719.

In one embodiment, a second application component 713 and the application module 711 may not have a transaction manager type specified. An instance-wide level may have a transaction manager type specified as "global", and the runtime logic may determine that the second application component's transaction should be managed as a global transaction. The transaction manager application module 725 may initiate a global transaction using the global transaction manager 731. The global transaction manager 731 may create a global transaction object 735 to manage a global transaction between the second application component 713 and the databases 721 and 723. In one embodiment of the invention, the local transaction and the global transaction may be managed concurrently by the application server.

Figure 8:
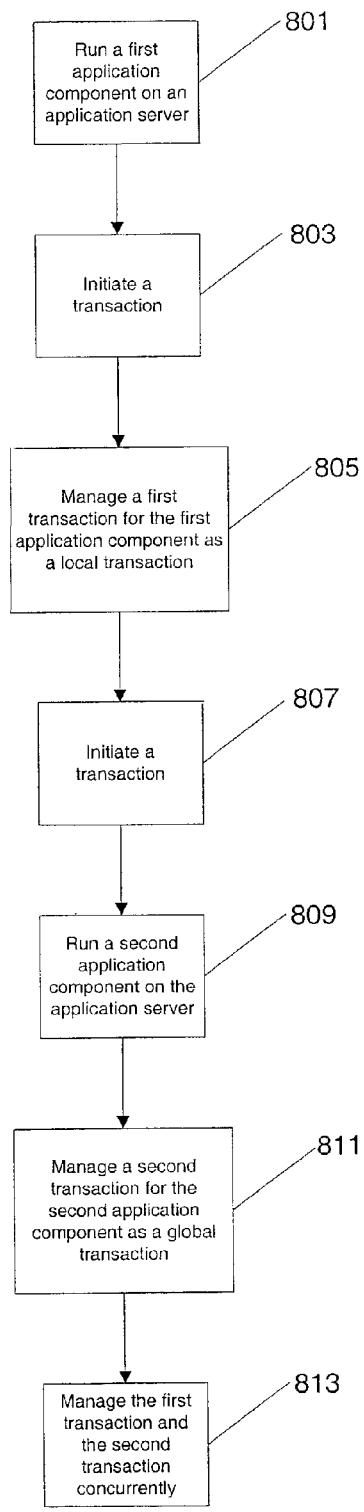
FIG. 8 illustrates an embodiment of a flowchart for managing a first transaction and a second transaction concurrently.

FIG. 8 illustrates an embodiment of a flowchart for managing a first transaction and a second transaction at the same time. It should be noted that in various embodiments of the methods described below, one or more of the steps described may be performed concurrently, in a different order than shown, or may be omitted entirely. Other additional steps may also be performed as desired.

At 801, a first application may be run on an application server. At 803, a transaction may be initiated. At 805, a first transaction may be managed from the first application component with a first data source as a local transaction. At 807, a transaction may be initiated. At 809, a second application component may be run on the application server. At 811, a second transaction may be managed from the second application with a second data source as a global transaction. At 813, the first transaction and the second transaction may be managed concurrently within the same application server instance.

Figure 9:
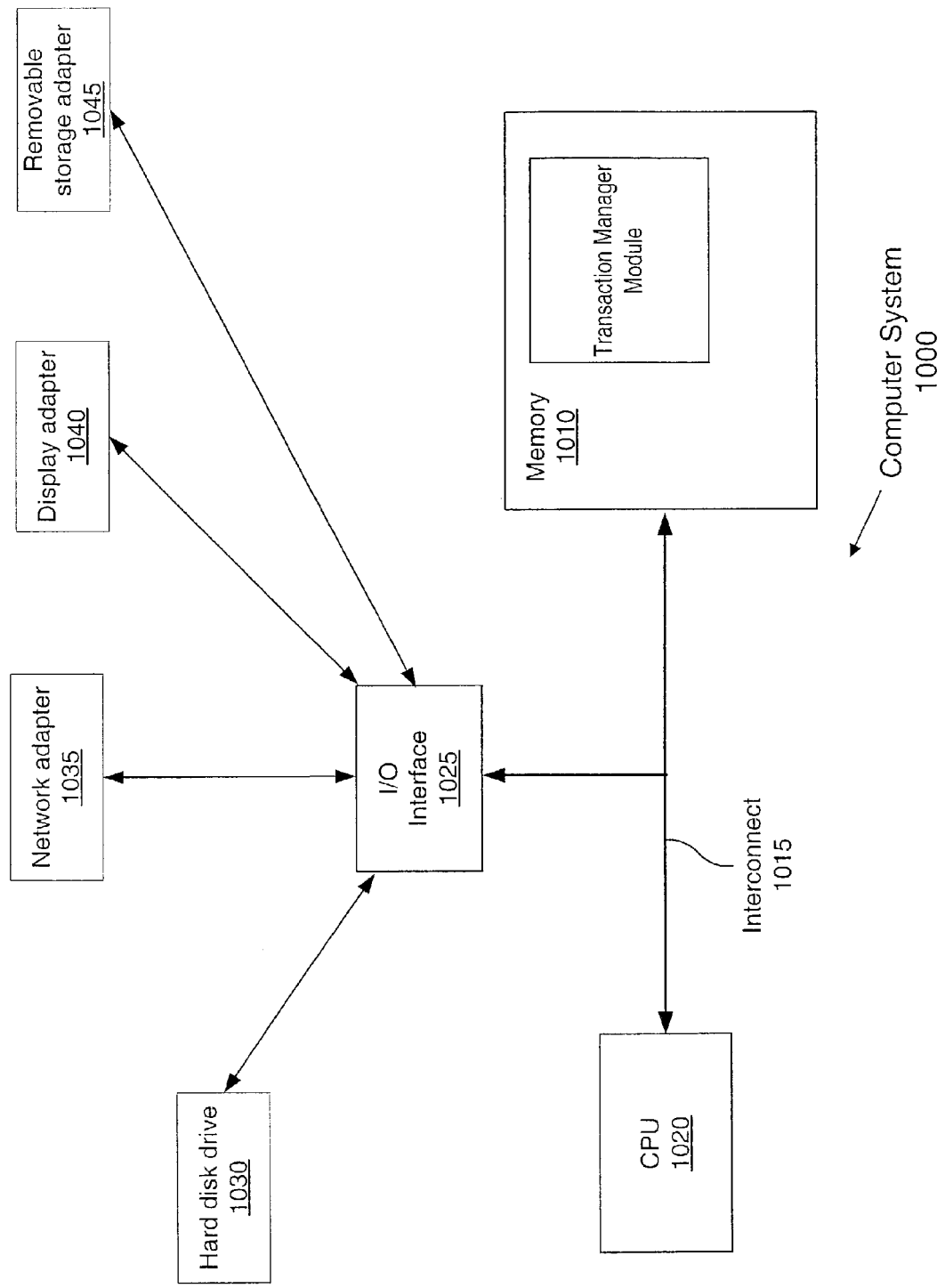
FIG. 9 illustrates one embodiment of a computer system that may include a transaction manager module and/or application server according to one embodiment.

FIG. 9 illustrates one embodiment of a computer system 1000 that may include an application server with transaction management module as described above. Computer system 1000 may include many different components such as memory 1010, a central processing unit (CPU) or processor 1020, and an input/output (I/O) interface 1025. Interconnect 1015 is relied upon to communicate data from one component to another. For example, interconnect 1015 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1000 preferably includes a memory medium on which computer programs according to various embodiments may be stored. The term "memory medium" may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1030, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1000 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1010 may store program instructions accessed by the CPU 1020. For example, instructions and data implementing a transaction manager module and/or application server may be stored in memory 1010.

Computer system 1000 may further include other software and hardware components, such as an input/output (I/O) interface 1025, that may be coupled to various other components and memory 1010. The CPU 1020 may acquire instructions and/or data through the I/O interface 1025. Through the I/O interface 1025, the CPU 1020 may also be coupled to one or more I/O components. As illustrated, I/O components may include a hard disk drive 1030, a network adapter 1035, a display adapter 1040 and/or a removable storage adapter 1045. Some components 1030 to 1045 may be coupled to the I/O interface 1025. In addition, the computer system 1000 may include one or more of a particular type of component. The computer system 1000 may include one or more components coupled to the system through a component other than the I/O interface 1025. Some computer systems may include additional and/or other components than shown in FIG. 10 such as application software (e.g., stored in memory 1010), other CPUs, video monitors or other displays, track balls, mice, keyboards, printers, plotters, scanners, or other types of I/O devices for use with computer system 1000.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system, comprising:
    one or more processors;
    memory coupled to the one or more processors and configured to store program instructions executable by the one or more processors to implement:
      a plurality of application components each configured to start a transaction involving access to one or more data sources, wherein a transaction manager type is specified at a module or component level for each of the application components, wherein the transaction manager type is specified as either global or local; and
      an application server configured to determine the transaction manager type specified for each component and manage each transaction using the specified type of transaction manager, wherein said determining the transaction manager type comprises searching for a specification of a transaction manager type at a plurality of levels, wherein the plurality of levels includes at least the module level and the component level.

2. The system as recited in claim 1, wherein transactions managed using a global transaction manager are committed using a two-phase commit protocol to either commit or rollback changes made during each respective transaction to a plurality of the data sources.

3. The system as recited in claim 1, wherein transactions managed using a local transaction manager are committed using a one-phase commit protocol to either commit or rollback changes made during each respective transaction to one of the data sources.

4. The system as recited in claim 1, wherein two or more of the application components are part of an application module, wherein the transaction manager type is specified at the module level for all of the application components of the module.

5. The system as recited in claim 4, wherein the application module comprises a Web Archive (WAR), Enterprise Java Bean (EJB), or Java Archive (JAR) file.

6. The system as recited in claim 1, wherein the transaction manager type is specified separately at a component level for two or more of the application components.

7. The system as recited in claim 6, wherein the two or more application components are servlet or Enterprise Java Bean (EJB) components.

8. The system as recited in claim 1, wherein the application server comprises runtime logic configured to determine the transaction manager type for each transaction according to the transaction manager type specified for the application component that initiates the transaction.

9. The system as recited in claim 8, wherein the runtime logic is configured to:
    determine whether a transaction manager type is specified at the module level for the transaction; and
    in response to determining that a transaction manager is specified at the module level for the transaction, return the transaction manager type specified at the module level.

10. The system as recited in claim 9, wherein the runtime logic is further configured to:
    in response to determining that a transaction manager is not specified at the module level for the transaction,
        determine whether a transaction manager type is specified at the component level for the transaction; and
        in response to determining that a transaction manager is specified at the component level for the transaction, return the transaction manager type specified at the component level.

11. The system as recited in claim 10, wherein the runtime logic is further configured to:
    in response to determining that a transaction manager is not specified at the module level and not specified at the component level for the transaction, return a default transaction manager type specified for the application server.

12. The system as recited in claim 1, wherein the transaction manager type is statically set for one or more of the application components in a deployment descriptor for each application component.

13. The system as recited in claim 1, wherein the application server is configured to concurrently manage both local and global transactions.

14. A method, comprising:
   determining a transaction manager type to use for a transaction initiated by an application component, wherein said determining comprises searching for a specification of a transaction manager type at a plurality of levels, wherein the plurality of levels includes at least a module level and a component level;
   returning the transaction manager type as specified at the module or component level for the application component;
   if said determining returns the transaction manager type as global, managing the transaction using a global transaction manager; and
   if said determining returns the transaction manager type as local, managing the transaction using a local transaction manager.

15. The method as recited in claim 14, wherein managing the transaction using a global transaction manager includes committing a two-phase commit protocol to either commit or rollback changes made during each respective transaction to a plurality of data sources.

16. The method as recited in claim 14, wherein managing the transaction using a local transaction manager includes committing a one-phase commit protocol to either commit or rollback changes made during each respective transaction to one data source.

17. The method as recited in claim 14, wherein determining a transaction manager type to use for a transaction comprises using runtime logic by the application server to determine the transaction manager type for each transaction according to the transaction manager type specified for the application component that initiates the transaction.

18. The method as recited in claim 17, wherein two or more of the application components are part of an application module, wherein the transaction manager type is specified at the module level for all of the application components of the module.

19. The method as recited in claim 17, wherein said determining the transaction manager type to use for a transaction using the runtime logic comprises:
   determining whether a transaction manager type is specified at the module level for the transaction; and
   in response to determining that a transaction manager is specified at the module level for the transaction, returning the transaction manager type specified at the module level;
   in response to determining that a transaction manager type is not specified at the module level for the transaction, determining whether a transaction manager type is specified at the component level for the transaction; and
   in response to determining that a transaction manager type is specified at the component level for the transaction, returning the transaction manager type specified at the component level.

20. The method as recited in claim 19, wherein said determining the transaction manager type to use for a transaction using the runtime logic further comprises:
   in response to determining that a transaction manager is not specified at the module level and not specified at the component level for the transaction,
      determining whether a default transaction manager type is specified for the application server; and
      in response to determining that a default transaction manager type is specified for the application server, returning the default transaction manager type specified for the application server.

21. The method as recited in claim 20, wherein said determining the transaction manager type to use for a transaction using the runtime logic further comprises:
   in response to determining that a transaction manager is not specified at the module level and not specified at the component level for the transaction, and that a default transaction manager type is not specified for the application server, returning an error.

22. The method as recited in claim 14, further comprising statically setting the transaction manager type for one or more of the application components in a deployment descriptor for each application component.

23. A computer-readable storage medium comprising program instructions, wherein the program instructions are computer-executable to:
   determine a transaction manager type to use for a transaction initiated by an application component, wherein said determining comprises searching for a specification of a transaction manager type at a plurality of levels, wherein the plurality of levels includes at least a module level and a component level;
   return the transaction manager type as specified at the module or component level for the application component;
   manage the transaction using a global transaction manager, if said determining returns the transaction manager type as global; and
   manage the transaction using a local transaction manager, if said determining returns the transaction manager type as local.

24. The computer-readable medium as recited in claim 23, wherein managing the transaction using a global transaction manager includes committing a two-phase commit protocol to either commit or rollback changes made during each respective transaction to a plurality of data sources.

25. The computer-readable medium as recited in claim 23, wherein managing the transaction using a local transaction manager includes committing a one-phase commit protocol to either commit or rollback changes made during each respective transaction to one data source.

26. The computer-readable medium as recited in claim 23, wherein determining a transaction manager type to use for a transaction wherein comprises using runtime logic by the application server to determine the transaction manager type for each transaction according to the transaction manager type specified for the application component that initiates the transaction.

27. The computer-readable medium as recited in claim 26, wherein two or more of the application components are part of an application module, wherein the transaction manager type is specified at the module level for all of the application components of the module.

28. The computer-readable medium as recited in claim 26, wherein the runtime logic is configured to:
   determine whether a transaction manager type is specified at the module level for the transaction; and
   in response to determining that a transaction manager is specified at the module level for the transaction, return the transaction manager type specified at the module level;
   in response to determining that a transaction manager type is not specified at the module level for the transaction, determine whether a transaction manager type is specified at the component level for the transaction; and in response to determining that a transaction manager type is specified at the component level for the transaction, return the transaction manager type specified at the component level.

29. The computer-readable medium as recited in claim 28, wherein the runtime logic is further configured to:

in response to determining that a transaction manager is not specified at the module level and not specified at the component level for the transaction, determine whether a default transaction manager type is specified for the application server; and in response to determining that a default transaction manager type is specified for the application server, return the default transaction manager type specified for the application server.

30. The computer-readable medium as recited in claim 29, wherein the runtime logic is further configured to:

in response to determining that a transaction manager is not specified at the module level and not specified at the component level for the transaction, and that a default transaction manager type is not specified for the application server, return an error.

31. The computer-readable medium as recited in claim 23, wherein the program instructions are further computer executable to:

statically set the transaction manager type for one or more of the application components in a deployment descriptor for each application component.

* * * * *